May 9, 1967
C. E. YOST
3,318,247
AUTOMATIC PUMP CONTROL
Filed March 12, 1965
2 Sheets-Sheet 1
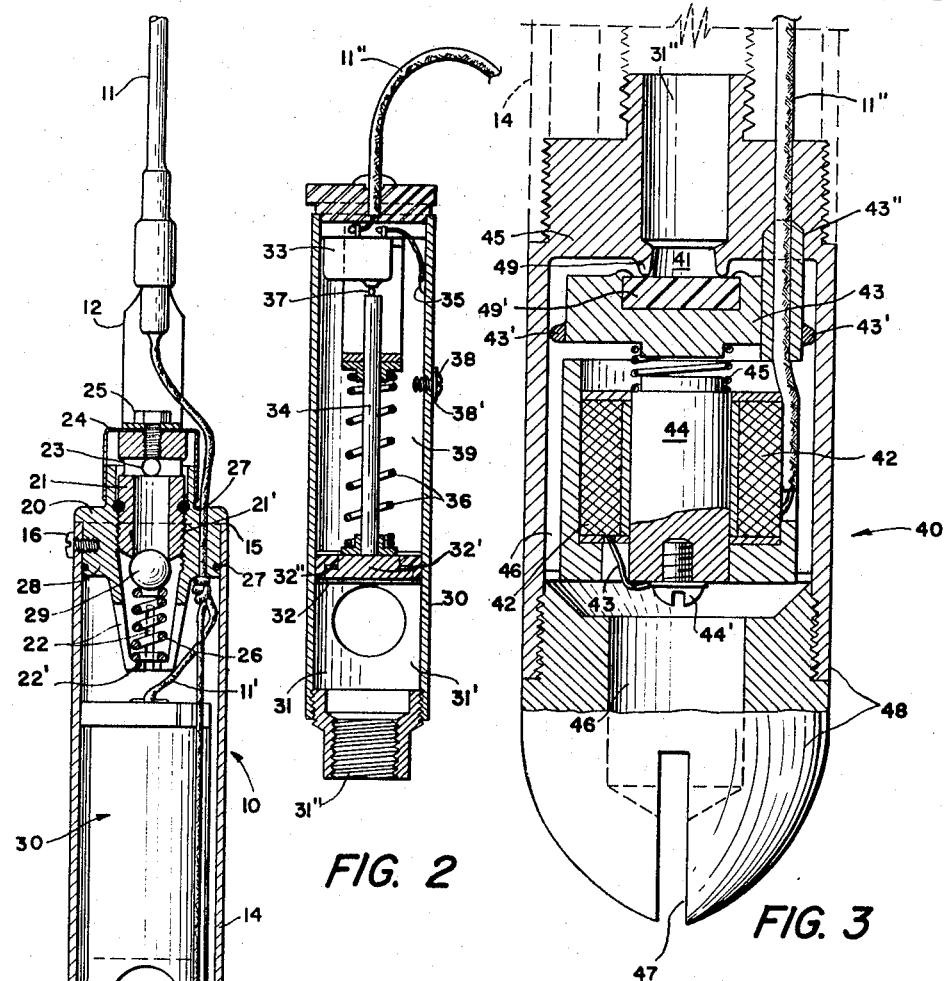
FIG. 2
FIG. 3
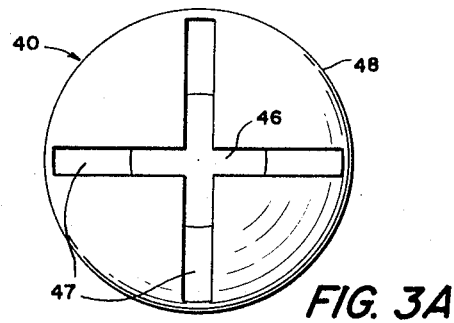
FIG. 3A
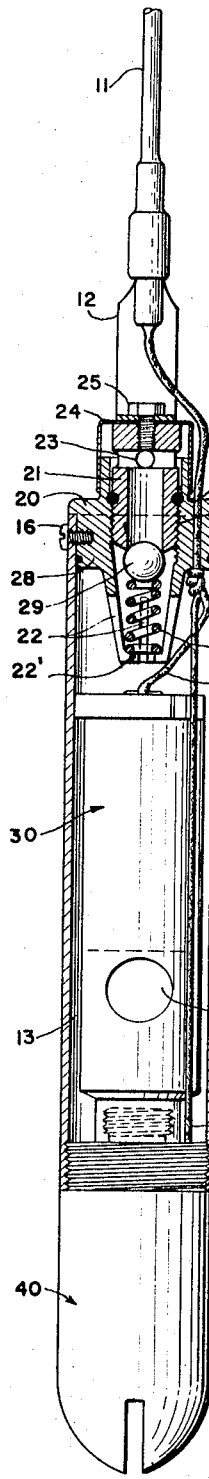
FIG. 1
INVENTOR
CLYDE E. YOST
BY Larson and Taylor
ATTORNEYS May 9, 1967
C. E. YOST
3,318,247
AUTOMATIC PUMP CONTROL
Filed March 12, 1965
2 Sheets-Sheet 2
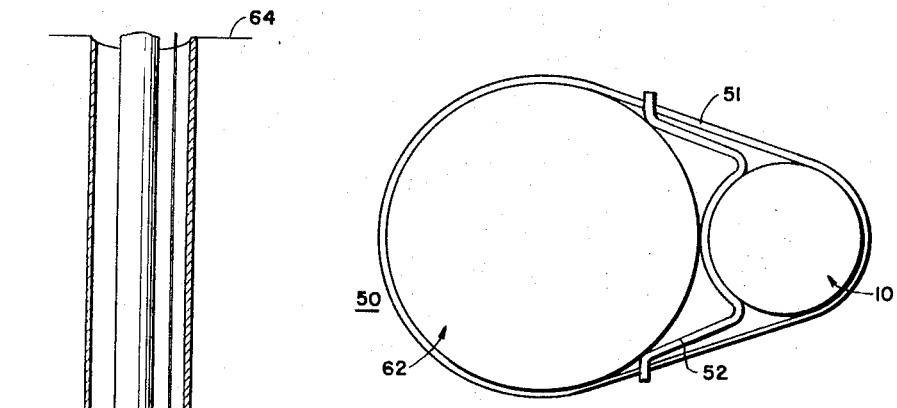
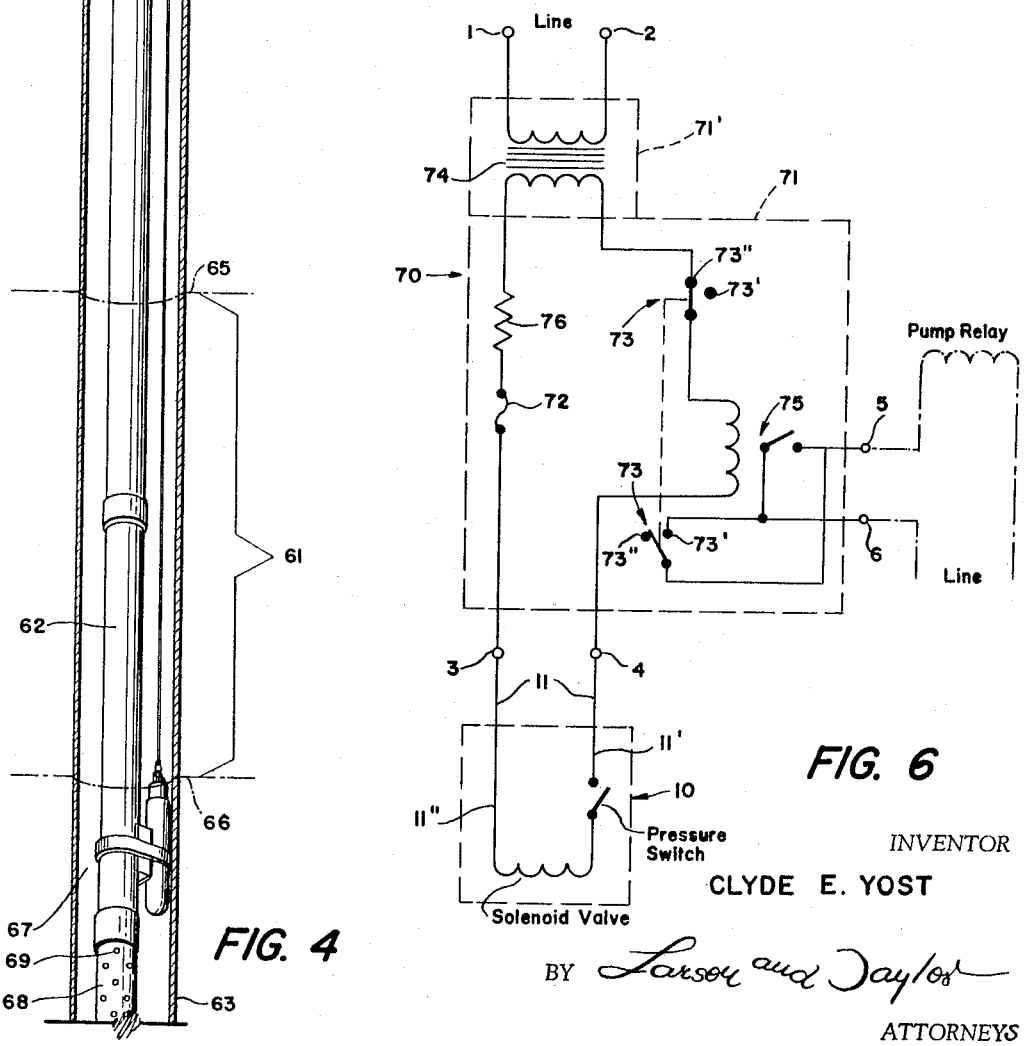
INVENTOR
CLYDE E. YOST
BY Larson and Taylor
ATTORNEYS

United States Patent Office 3,318,247
Patented May 9, 1967

3,318,247
AUTOMATIC PUMP CONTROL
Clyde E. Yost, 700 S. Villa Drive,
Evansville, Ind. 47714
Filed Mar. 12, 1965, Ser. No. 439,324
10 Claims. (Cl. 103—25)

This invention relates to a switching device which opens and closes an electrical circuit in response to a change in fluid pressure between predetermined values. In one particular embodiment, this invention relates to a switching device to control the pumping of fluids by automatically de-activating a pump when a low-level of fluid height is reached, and automatically allowing a pump to be activated when a high-level of fluid height is reached. The invention is applicable to many types and kinds of fluids and is particularly applicable to the pumping of fluid from an oil well.

The switching device comprises a unitary pressure control unit in association with an electrical control circuit. The pressure control unit includes a pressure-actuated valve system, a pressure-sensitive switching system and an electrically actuated valve system. When the fluid to be pumped reaches a predetermined high-level, the pressure generated by the fluid temporarily actuates the pressure actuated valve system, allowing the fluid pressure to be transmitted to the pressure-sensitive switching system. The pressure transmitted thereby causes the switching system to close the electrical control circuit which allows the activation of the pump. When the switching system closes the control circuit, it also allows an electrical current to actuate the electrically actuated valve system, permitting the fluid pressure to be continually transmitted to the switching system after the pressure actuated valve system has de-actuated due to decreased fluid pressure. When the fluid level has receded to a predetermined low-level such that the fluid pressure is less than the pressure sensitivity of the switching system, the switching system opens the control circuit, thereby de-activating the pump and de-actuating the electrically actuated valve system. The switching system is then isolated from the fluid pressure and remains so until the fluid again rises up to the high-level point and the switching cycle is repeated.

This invention discloses a device which is applicable to many uses. It can be used wherever electricity is used as a motivating power, such as in an electric motor driven oil well pump. It can also be used in instances where the pumping system is gasoline engine driven. However, due to the nature of a gasoline engine, action can be automatically stopped but cannot be automatically re-started without modification of the engine ignition system.

In the case of an oil well this has a great advantage for with the present invention pumping will be stopped when the fluid in the hole has reached a predetermined low level. The pump will subsequently be started when the fluid has risen to a predetermined high level and will then continue pumping until the fluid has once more receded to the desired low level. It will again automatically stop pumping and await the next starting cycle.

Previously, the pumping out of oil wells was controlled manually. The job of the person controlling the well is to watch the flow of the fluid being pumped from the well and, when the pump has exhausted the fluid from the well, to shut off the pump to allow the fluid to recover. This job is complicated by widely dispersed well locations; by inaccessible locations of wells; by bad weather conditions and by total number of wells to be watched. Furthermore, all oil-bearing formations do not surrender the fluid at the same rate, therefore additional complications arise. The human element likewise injects a degree of uncertainty.

In many instances an electric clock is used to time the pumping cycle. In such a situation the time clock often continues to call for pumping even though the fluid has been exhausted from the well. When this condition exists, damage is done to the equipment down in the well hole in the form of undue wear on the cups and working barrel surface. It also causes a condition referred to as "cut oil." The damage is costly as it requires pulling of the equipment to repair the damage.

Other alternatives for controlling pumping system have been proposed, e.g., the dual switching system described in U.S. Patent No. 3,132,592, but these alternative solutions all have basic inherent disadvantages. The present invention overcomes these disadvantages.

For example, in the present invention the fluid to be pumped does not pass through the control device itself, rather the control unit relies only on the transmission of fluid pressure through the device. Fluid flowing through a control device carries sediment and foreign matter into it causing the moving and stationary parts contained therein to become "clogged," "gummed" or "sludged." Furthermore, the moving parts of the present invention move only to a very minute degree. For example, in the particular embodiment detailed infra, the solenoid valve seal moves less than 1/16 of an inch, the diaphragm 0.003 of an inch and the spring in the spring loaded valve moves only enough to allow transmission of pressure and such movement is negligible. In fact, due to the negligible movement of the spring, the spring does not flex and therefore cannot fail from fatigue. Thus, the instant control unit is mechanically sounder and longer lasting.

In addition, because of the compactness and unitary structure of the instant invention, the unit can be manufactured less expensively and can be transported from one location to another with ease, allowing maximum use of each individual control unit.

Furthermore, the use of a pressure actuated valve permits the instant invention to be readily and simply adjusted in a mechanical way "on site" to suit the unique conditions of each location or to vary without difficulty the maximum high level point of the fluid to any height desirable.

Finally, the construction and operation of the invention is such that the control unit may be installed after the oil piping has been set in the oil well casing without going through the expensive and time-consuming operation of pulling the piping to make the installation.

Thus an object of the present invention is to provide an automatic control for a pump which will cyclically allow the activation and de-activation of a pump when the fluid to be pumped reaches a predetermined high-level and low-level, respectively.

Another object is to provide an automatic pump control device which is small in size, simple in construction, mechanically sound and long lasting.

A further object is to provide an automatic pump control device which is comparatively inexpensive, compact and easily transported.

An additional object is to provide a pressure-sensitive switching mechanism which is adjustable "on site" to suit the conditions of each location or to vary the maximum high level point of the fluid to any height desirable.

Another object is to provide an automatic pump control device for an oil well which can be simply installed in the well after the piping has been placed in the well without the necessity of pulling the piping.

Other objects and many of the attendant advantages of the present invention will become more readily apparent upon consideration of the following detailed specification when considered in connection with the accompanying drawings wherein:

FIG. 1 is a side view, partially in section, of an embodiment of the pressure control unit of the instant invention;

FIG. 2 is a cross-sectional view of the pressure chamber swtiching system of the embodiment of FIG. 1;

FIG. 3 is a side view, partially in section, of the solenoid valve system of the embodiment of FIG. 1;

FIG. 3A is a bottom plan view of the embodiment of FIG. 1 showing the pressure inlet portion of the solenoid valve system of FIG. 3;

FIG. 4 is a perspective view of the embodiment of FIG. 1 mounted on the working barrel of an oil well inside the well casing with the well casing partially cutaway;

FIG. 5 is a cross-sectional view of the embodiment of FIG. 1 mounted on the working barrel of an oil well; and FIG. 6 is a schematic view of an electrical control circuit utilizable with the present invention.

FIG. 1 shows an automatic pressure pump-control unit 10 which comprises three sub-systems: a spring-loaded ball valve system 20, a pressure chamber switching system 30, and a solenoid valve system 40.

All of the sub-systems are associated with the fluid containing chamber 13 which is partially defined by the chamber wall 14. The control unit 10 includes a cable 11 which is a two wire, fluid resistant, shielded, electrical cable and is connected to the control unit 10 by means of a clip 12 or by a chain or other suitable means. The cable serves to electrically connect the pressure control unit 10 to the rest of the pumping control system.

At the top end of the pressure control unit 10 is a spring loaded ball and valve system 20 which is actuated by fluid pressure operating on the ball seal 29 and which has an adjusable seat member therein. The seat member 21 is designed in such a way that the spring load pressure caused by spring 26 on the ball seal 29 can be easily adjustable, for example by screw-thread means 21'. By varying the relative position of the adjustable seat member 21 within the valve support structure 28 by means of the screw-thread 21', the tension in the spring 26 is altered. The relative position of the adjustable seat member 21 thus determines the threshold fluid pressure necessary to open the ball and valve system 20. The adjustable seat member 21 can be provided with an index to indicate the threshold pressure or some parameter thereof for which the valve system 20 is set.

The adjustable seat member 21 is also provided with two cross drilled holes 23 on the side surface to allow exterior fluid pressure to act on the ball seal and, at the valve's opening, on the interior of the chamber 13. A screen 24 is included to cover the side located holes 23 to reduce the danger of foreign matter or fluid sediment entering the chamber 13. A screw 25 can be used to hold the screen 24 and the clip 12 in place. In order to positively communicate the fluid pressure within the valve system 20 to the fluid chamber 13, the bottom portion of the valve support structure 28 has two slots 22 at right angles to each other and a circular aperture 22' cut therein. To insure a pressure tight seal between the valve parts, two O-ring seals 27 are used.

Included in the chamber 13 and positioned below the valve system 20, is a pressure chamber switching system 30. The fluid presure in chamber 13 is transmitted to the interior of the switching system by means of two opposing circular apertures 31'. As seen in FIG. 2, the fluid pressure in the interior pressure chamber 31 is directly communicated to the diaphragm 32 causing it to be depressed. If such pressure is sufficient to overcome the light restraining spring 36, the depression in the diaphragm 32 will be carried over by means of the mechanical linkage 34, to the contact head 37 of the micro-switch 33 causing the normally open micro-switch to be actuated or closed. The micro-switch 33 is electrically connected by means of the insulated lead 11' and the "ground" contact 35 to an appropriate control circuit, for example the circuit 70 of FIG. 6, whereby when the switch 33 is closed the control circuit is completed. When the fluid pressure in chamber 13 and hence in pressure chamber 31 is insufficient to overcome the restraining spring 36, then the micro-switch is reopened and the circuit is broken.

Because the restraining spring 36 has much less tension in it than the spring 26, the fluid pressure necessary to actuate the switch 33 is always much less than the fluid pressure necessary to open the ball valve system 20.

Behind the diaphragm 32 is a backup plate 32' capable of slight movement through the space 32". The backup plate 32' prevents the diaphragm 32 from rupturing when very high pressures are exerted in the pressure chamber 31.

Located directly below the pressure chamber switching system 30 and screwably attached thereto is a solenoid valve system 40. A port 31" allows direct or positive fluid pressure communication between the pressure chamber 31 (and hence the fluid chamber 13) and the solenoid fluid chamber 41 of the solenoid valve system 40. As is shown in FIG. 3, the solenoid coil 42 is electrically connected in series with the micro-switch 33 by means of the insulated wire 11" and the "ground" contact 43. The "ground" contacts 35 and 43 are electrically the same because of the interconnecting metal structure. Thus, when the micro-switch 33 closes, and completes the control circuit, the solenoid coil 42 is energized causing the movable guided member 43 to be attracted by and toward the magnetized solenoid core 44. The tension spring 45, which normally keeps the annular sealing lip 49 in sealing relationship wth the flexible sealing material 49', is then compressed, breaking the seal, and the solenoid valve is opened. The opening of the solenoid valve 40 places the pressure chamber in positive fluid pressure communication with the exterior fluid by means of the solenoid fluid chamber 41 and the exterior fluid chamber 46. Exterior fluid is allowed to enter the chamber 46 by means of fluid inlet ports formed by two right angle slots 47 in the solenoid valve housing 48.

The movable guided member 43 is provided with guides 43' to control the direction of movement and the free floating action. Lead wire 11" has a protective sleeve 43" to prevent undue wear due to the slight movement of the member 43. The solenoid valve is held in place by a blind set screw 44' through the outer case of the valve. The coil is made of hex stock to allow open space around the coil.

The solenoid valve 40 will remain open as long as the electrical switch 33 is closed or hence until the exterior fluid pressure drops below the minimum value necessary to overcome the restraining spring 36. When the solenoid valve 40 closes, the control unit 10 will remain inactive until the exterior fluid pressure reaches the predetermined maximum level and the switching cycle is reinitiated.

The solenoid valve system 40 is screwably attached to the chamber wall 14 and the ball and valve system 20 is joined to the chamber wall 14 by a shoulder abutment joint 15 and is retained in place by holding screws 16 or other means such as press pins. The pressure control unit 10 thus forms a simple unitary integrated device.

When the pressure control unit 10 is to be used in an oil well for controlling an oil pump, it can be mounted on the working barrel 62, as shown in FIG. 4 and FIG. 5, by means of a saddle clamping system 50, if the piping has not yet been set in the well. A saddle clamp 52 is furnished to rigidly align the two round surfaces of the control unit 10 and the working barrel 62 and hold them in proper position. A standard band clamp 51 securely attaches the control unit 10 to the working barrel 62.

If the oil well has been completed and the piping has already been installed, the pressure control unit 10 is suspended on the two wire cable 11 and lowered into the hole to the proper depth by feeding the cable into the oil well casing 63. The pressure control unit 10 is contained in a wire mesh enclosure or is suspended by a suitable clip which is in turn fastened to the two wire cable 11, so that no weight is exerted on the cable splice or the adjustable seat member 21 to prevent maladjustment or loss of the unit in the hole. This also prevents the possibility of twisting of the cable which could change the setting of the adjustable seat 21 caused by differential heat changes, etc., in various depths of holes. This method of installation also provides a means of making changes in the adjustment of the seat member 21, e.g., for altering the level of maximum fluid pressure desired or compensating for changes which occur in the environmental conditions or in the production rate of the well, without pulling the piping in the well to make the changes.

Actually the desired low level of the pumping action can be determined by lowering the unit 10 into the well until the well pumps off, i.e., until the fluid has reached the low level where air is being drawn into the top hole 69 of the perforated nipple 68. The control unit 10 can then be raised slightly and left there for operation, thus preventing damage to the formation by contact with the air.

The unit 10 can even be used as a probe. Thus, if one were to immerse the unit in the fluid deeply enough to activate the switch 33, and then raise the unit until the switch 33 deactivated, the length of cable 11 then in the hole would represent the below-ground-level depth of the fluid. In other words, by familiarity with the device, the control unit 10 can be used to great advantage. It is truly an "underground periscope."

When the unit 10 is placed in position in the oil casing 63, both valve systems 20 and 40 are closed isolating the interior fluid, i.e., the fluid inside the unit 10, from the exterior fluid 67 and hence the micro-switch is open. When the fluid 67 reaches a level 65 sufficient to produce a fluid pressure on the ball seal 29 great enough to open the ball valve system 20, the exterior fluid pressure is communicated, as seen supra, to the switching system 30 actuating the micro-switch 33. The closing of the switch 33 turns on an oil pump by means of an appropriate electrical circuit, e.g., the electrical circuit 70 of FIG. 6. Simultaneously, the solenoid valve system 40 is opened allowing additional pressure communication between the exterior and the interior fluids. After the oil pump has caused the fluid 67 to recede below the lever 65, the ball valve system 20 closes, leaving pressure communication only through the solenoid valve system 40. The oil pump will continue to remove the fluid 67 until the fluid recedes to a level 66 which is too low to produce a fluid pressure sufficient to maintain the pressure-dependent switch 33 in closed position. The switch 33 will then open, simultaneously shutting off the oil pump and closing the solenoid valve system 40. The interior fluid will then again be isolated from the exterior fluid pressure until the fluid 67 rises to the level 65 and the switching cycle is repeated.

By utilizing the simply adjustable feature of the seat member 21, the control unit can be programmed for any fluid height or "head" 61 desired. At the time of fabrication of the control unit 10, the pressure of the spring 26 acting on the ball seal 29 to cause pressure on the seat member 21 can be approximately set to desired column height or threshold pressure range. The unit 10 can then in the field or "on site" be exactly adjusted with simple tools by means of the adjustable member 21 for the precise column height 61 desired and adjusted for the environmental conditions at the site, e.g., the density of the fluid 67, the geothermal gradient, etc.

The pressure switching system 30 can be provided with a pressure equalizing plug 38 and O-ring pressure seal 38'.

By use of this plug, the pressure in the pressure tight chamber 39 can be set at any desired level, e.g., normal atmospheric pressure, at the time of fabrication of the control device 10.

Because fluid does not flow through the unit 10, the control device can be filled at the time of fabrication or immediately before installation with a fluid which is free of all foreign matter and is beneficial (good lubricating properties, rust preventive, spark-suppressive, etc.) to the interior of the device. However, in order to avoid loss of the fluid to the exterior fluid, the added fluid must be of approximately the same density as the exterior fluid.

A control circuit 70 which is utilizable with the control unit 10 when used to regulate a pump is shown in FIG. 6. The electrical components are mounted in a control box 71 which is a standard metal box. The box 71 is equipped with a safety fuse 72 and can be completely wired ready to be connected to the incoming power line (terminals 1 and 2), the two wire cable 11 from the pressure control unit 10 (terminals 3 and 4), and the outgoing control line (terminals 5 and 6). A switch 73 is provided to observe and check the "down hole equipment." If the switch is placed in the "on" position 73' and no fluid is being pumped, it is an indication that the well is in need of attention as far as the "down hole equipment" is concerned. Having the switch in the "auto" position 73" places the automatic pressure control unit in the circuit. An isolation transformer 74 is placed in the control circuit to make doubly sure that the system is safe and that polarity will not cause damage or injury. A relay 75 is included which controls the pump motor relay circuit.

A resistance 76, variable in value, is incorporated in the control box 71 to compensate for the resistance variation of the two wire cable 11 between a shallow hole (short length of cable) and a deep hole (long length of cable) to insure that the proper voltage is delivered to the pressure control unit 10 at the bottom of the hole.

Since many applications will involve motors of 3 horsepower or more where a 220-volt system is used and other applications will utilize a 110-volt system, an easily replaceable transformer for 220 primary to 110 secondary is furnished; in the case of a 110-volt source a 110-volt isolation transformer is furnished. The transformer 74 is mounted conveniently for this possible alteration by mounting it to the outside of the control box 71 in a subbox 71'.

Some suitable dimensions for the control device 10 are as follows:

| Element: | Dimension |
| --- | --- |
| 10 | 11/19" dia., 8" length. |
| 22 | 3/64" wide x ½" deep. |
| 22' | ¼" dia. |
| 21 | ½" dia. |
| 31' | ½" dia. |
| 32" | .003–.005". |
| 65 | 10 feet–20 feet. |

The metal parts of the control unit 10 can be made of T-300 series stainless steel and the O-ring seals, diaphragm and sealing material of buna N material.

While in the foregoing specification, I have set forth certain details in structure and in steps as illustrating one embodiment and use of the invention, it will be understood that such details may be varied widely by those skilled in the art without departing from the spirit of my invention.

I claim:

1. An automatic pressure control unit for sensing predetermined maximum and minimum pressure levels of an exterior fluid comprising:

containing means for containing an interior fluid,
     switching means for controlling an electrical switch
       by maintaining said electrical switch in a first position when an exterior fluid pressure is acting on said interior fluid and the exterior fluid pressure is above a predetermined minimum level and by maintaining said electrical switch in a second position when said interior fluid is isolated from said exterior fluid pressure and when said exterior fluid pressure is below said minimum value, valve means in direct communication with said exterior fluid pressure for alternately allowing said exterior fluid pressure to act on said interior fluid and isolating said interior fluid from said exterior fluid pressure, mechanical means for producing a mechanical force on a portion of said valve means which is greater than the force on said portion of said valve means produced by the exterior fluid pressure when said exterior fluid pressure is below said maximum level and is less than the force on said portion of said valve means produced by the exterior fluid pressure when said exterior fluid pressure is above said maximum level, and electrical means for producing an electromagnetic force on said valve means when said electrical switch is in said first position.

2. An automatic pressure control unit for sensing predetermined maximum and minimum pressure levels of an exterior fluid comprising:

containing means for containing an interior fluid, a first valve means for allowing exterior fluid pressure to act on said interior fluid by opening when said exterior fluid pressure is above a predetermined maximum level and for partially isolating said interior fluid from said exterior fluid pressure by closing when said exterior fluid pressure is below said maximum level, switching means for controlling an electrical switch by maintaining said electrical switch in a first position when said exterior fluid pressure is acting on said interior fluid and the exterior fluid pressure is above a predetermined minimum level and by maintaining said electrical switch in a second position when said exterior fluid pressure is completely isolated from said interior fluid and when said exterior fluid pressure is below said minimum level, and a second valve means for allowing said exterior fluid pressure to act on said interior fluid when said electrical switch is in said first position.

3. A control apparatus as in claim 2 wherein said second valve means also isolates said interior fluid from said exterior fluid pressure when said electrical switch is in said second position.

4. A control apparatus as in claim 3 wherein the interior fluid remains substantially stationary within the said containing means while said electrical switch is in first position.

5. A control apparatus as in claim 3 wherein said electrical switch and said second valve means are electrically connected in series.

6. A control apparatus as in claim 3 wherein said switching means comprise a pressure sensitive micro-switch assembly and said second valve means comprise a solenoid valve system, the micro-switch of the switching means and the solenoid of the second valve means, being electrically connected in series.

7. A control apparatus as in claim 3 wherein said first valve means comprises a seat member, a sealing member exposed to said exterior fluid pressure, and a tension producing member, said tension producing member producing a force on said sealing member which is equal to the force produced on said sealing member by the exterior fluid pressure when said exterior fluid pressure is at said maximum level whereby when said exterior fluid pressure is below said maximum level said sealing member is closed against said seating member and when said exterior fluid pressure is above said maximum level said sealing member is open and spaced from said seating member.

8. A control apparatus as in claim 7 wherein said tension producing member is a spring fixedly attached to said containing means and said seating member is adjustably attached to said containing means whereby the force produced on said sealing member by said tension producing member can be changed by adjusting the relative positions of said seating member and said tension producing member.

9. A control apparatus as in claim 8 wherein said sealing member is a ball seal and screw thread means adjustably interconnects said seating member and said containing means.

10. An automatic pressure control unit for turning on and off an oil pump for an oil well when the oil-bearing fluid in said oil well is above a predetermined maximum level and below a predetermined minimum level, respectively, comprising:

a unitary, structurally rigid container capable of being pressure-tight for enclosing an interior fluid, a spring-loaded ball valve having a spring, a spring supporting member supporting said spring, a ball seal and a ball-receiving seating member receiving said ball seal, the spring being located between said spring supporting member and said ball seal and producing a force on said ball seal against said ball-receiving seating member, the spring supporting member being fixedly attached to said container and the seating member being adjustably attached by screw-thread means to said container whereby said force can be changed by altering the position of said seating member within said container, a pressure-sensitive micro-switch, having an electrical switch associated therewith, within said container, a solenoid valve having a valve sealing member and a solenoid coil, said solenoid coil being electrically connected in series with said electrical switch and being capable of acting on said valve sealing member whereby said solenoid valve is opened and closed by the action of said solenoid coil, and a cable having two electrical wires therein, one of said wires being electrically connected to said electrical switch and the other of said wires being electrically connected to said solenoid coil, a portion of said cable being outside of said container and a portion of said cable being within said container, whereby said electrical wires are capable of connecting said electrical switch and said solenoid coil in series to an external circuit controlling said oil pump, said ball valve and said solenoid valve forming a portion of said container, and said ball-valve, said pressure-sensitive micro-switch and said solenoid valve being related each to the other by a common fluid pressure system within said container.

References Cited by the Examiner
UNITED STATES PATENTS

| | | | |
|---|---|---|---|
| 1,244,485 | 10/1917 | Fischer | 73—300 |
| 1,511,432 | 10/1924 | Skidmore | 103—25 |
| 1,543,149 | 6/1925 | Bigler | 103—25 |
| 2,380,884 | 8/1945 | Von Stoeser et al. | 222—64 |
| 2,869,475 | 1/1959 | Bobo | 103—233 |
| 2,915,975 | 12/1959 | Kittrell | 103—25 |
| 2,968,707 | 1/1961 | Martin et al. | 103—25 |
| 3,285,183 | 11/1966 | Hembru et al. | 103—25 |

DONLEY J. STOCKING, *Primary Examiner.*

SAMUEL LEVINE, *Examiner.*

W. L. FREEH, *Assistant Examiner.*